United States Patent
Nann et al.

(10) Patent No.: US 6,635,386 B2
(45) Date of Patent: *Oct. 21, 2003

(54) PROCESS FOR PRODUCING AN INDUSTRIAL ELECTROLYTE FOR LEAD STORAGE BATTERIES IN THE FORM OF A THIXOTROPIC GEL

(75) Inventors: Eberhard Nann, Soest-Deiringsen (DE); Jean Ruch, Brilon (DE)

(73) Assignee: Accumulatorenwerke Hoppecke Carl Zoellner & Sohn GmbH & Co. K.G. (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 15 days.

(21) Appl. No.: 09/213,556

(22) Filed: Dec. 17, 1998

(65) Prior Publication Data

US 2001/0051301 A1 Dec. 13, 2001

(30) Foreign Application Priority Data

Dec. 23, 1997 (DE) .......................... 197 57 481

(51) Int. Cl.[7] .......................... H01M 6/14; H01M 6/04
(52) U.S. Cl. ................ 429/300; 429/188; 429/204; 429/302
(58) Field of Search .................... 429/188, 300, 429/302, 204

(56) References Cited

U.S. PATENT DOCUMENTS 3,556,860 A * 1/1971 Amile ........................ 429/118
3,765,943 A * 10/1973 Biagetti .................. 429/227 X
4,687,718 A * 8/1987 Chreitzberg et al. ........ 429/190
4,889,778 A * 12/1989 Misra et al. ................. 429/302
5,149,606 A * 9/1992 Bullock et al. ............. 429/228

FOREIGN PATENT DOCUMENTS

| CH | PS 151 045 | 5/1932 | | |
| DE | A 459 909 | 5/1928 | | |
| DE | A-3041953 | 11/1980 | | |
| DE | 0272474 | * 6/1998 | .......... H01M/10/00 |
| EP | A-0272474 | 11/1987 | | |

OTHER PUBLICATIONS

Chemical Engineer's Handbook, 1973, 5th ed., McGraw-Hill Book Company, p. 21–11.*

* cited by examiner

Primary Examiner—Stephen Kalafut
Assistant Examiner—Julian Mercado
(74) Attorney, Agent, or Firm—Cantor Colburn LLP

(57) ABSTRACT

The problem of this invention is based on specifying a process for producing an industrial electrolyte that can be designed in the form of a thixotropic gel in the cells of lead storage batteries, with which large quantities of the liquids needed to fill the lead storage batteries can be prepared and mixed to improve its industrial usability. For the technical solution to this problem, the invention proposes that in the active masses of positive and negative plates in the storage battery cells, the quantity of sulfuric acid necessary to adjust the final acid density of the industrial electrolyte for the ready-to-use storage battery be stored in the form of lead sulfate, while, independently of this, water is set to a pH value from 4.1 to 4.7 by adding an acid and is then mixed with a gel former.

10 Claims, No Drawings

PROCESS FOR PRODUCING AN INDUSTRIAL ELECTROLYTE FOR LEAD STORAGE BATTERIES IN THE FORM OF A THIXOTROPIC GEL

BACKGROUND OF THE INVENTION

The invention concerns a process for producing an industrial electrolyte that can be designed in the form of a thixotropic gel in the cells of lead storage batteries.

Lead storage batteries with industrial electrolytes in the form of a thixotropic gel are known in and of themselves and have the advantage of being leak-free and maintenance-free. Putting the gel in the storage battery during production is still a problem.

According to DE-A-459909, the main components of the industrial electrolyte are placed in the cells separated from one another. First, the sulfuric acid is stored in the form of lead sulfate in the active masses of the electrode plates and the cells are provided with a dry filling, if necessary. Distilled water is not poured into the cells except by the end user, so that during charging, the sulfuric acid becoming free again with water forms the industrial electrolyte.

According to DE-A-3041953, only part of the acid necessary for the final acid density is placed in the active masses of the electrode plates. During start-up, a sulfuric acid-forming mixture is used, and the battery is filled with it.

According to EP-A-0272474, all the sulfuric acid that is necessary to adjust the final acid density of the industrial electrolyte of the ready-to-use battery is stored as lead sulfate in the active masses of the positive and negative plates. In the second step in the process, a water-forming mixture with an hydrogen-ion former, in predetermined quantities, composed of either phosphoric acid or sodium hydrogen sulfate, and a gel former in the form of pyrogenic silicone dioxide are mixed in, and the storage battery cells are filled with it, and the water is basically mixed with the hydrogen-ion former or some parts of it before the gel former.

All known processes described in the past have the disadvantage that only small quantities can be mixed in, as they are needed for the manufacturing or start-up process of lead storage batteries. If the quantities prepared and produced are too large, there is a danger that the gel former will be ineffective, so that residual quantities that are not recyclable now are no longer suitable for industrial use.

Starting from the state of the art, the problem of this invention is to specify a process for producing an industrial electrolyte that can be designed in the form of a thixotropic gel in the cells of lead storage batteries, with which large quantities of the liquids needed to fill the lead storage battery can be prepared and mixed to improve the industrial usability and the production method.

SUMMARY OF THE PRESENT INVENTION

For the technical solution to this problem, the invention proposes that in the active masses of positive and negative plates in the storage battery cells, the quantity of sulfuric acid needed to adjust the final acid density of the industrial electrolyte of the ready-to-use storage battery is stored in the form of lead sulfate, while independently of this, water is set at a pH value of 2 to 4.7 by adding an acid, and is then mixed with a gel former.

Surprisingly, it has been shown that the specified pH range for the gel former represents a delay, so that the water/acid/gel former mixture produced can also be mixed in large quantities and can be utilized over a longer period of time.

Normally, the sulfuric acid in the plates in the form of lead sulfate is stored both electro-chemically and also chemically.

In the chemical process, the storage battery cells mounted with still unmolded positive and negative plates are filled with sulfuric acid. After a certain time, lead sulfate in the quantity necessary for the final acid density of the industrial electrolyte for the ready-to-use storage battery is formed in the active masses. The remaining sulfuric acid is taken out of the cell vessels again.

In an electrochemical process, storage battery cells with the positive and negative plates mounted are first molded, i.e., the storage battery is charged by being filled, preferably with sulfuric acid. After the end of the charging program, the acid density of the electrolyte is adjusted by acid exchange or by the addition of more sulfuric acid, so the acid stored in the active masses in lead sulfate during subsequent discharge and the remaining residual acid density in the plates and separators is dimensioned so that the final acid density of the industrial electrolyte for the ready-to-use storage battery is formed from it. After the battery is discharged, the electrolyte is removed and replaced by the water-gel former mixture.

According to one very advantageous proposal in the invention, during the process when lead sulfate is formed, the sulfuric acid is circulated in the cells. This homogenizes the acid density in the positive and negative plates and in the cell.

According to another advantageous proposal in the invention, circulation is also brought about by filling the storage battery cells with the water-gel former mixture, which also homogenizes it. According to another advantageous proposal in the invention, the water-gel former mixture circulates after the storage battery cells are filled with it and if necessary during a charging process until a gelling process is used.

In an advantageous way, circulation is provided by blowing in air.

The invention also proposes very advantageously that boric acid be used to adjust the pH value. The boric acid can be mixed with water, instead of phosphoric acid or sodium hydrogen sulfate, to set the pH value and has another positive delaying effect in terms of the gel former.

Advantageously, the cells can also be filled with phosphoric acid when filled with the water-gel former mixture, which has a positive influence on the cycle strength.

BRIEF DESCRIPTION OF THE INVENTION

The invention proposes a process that is easy to carry out, which greatly enhances the industrial production of lead storage batteries with industrial electrolytes in the form of thixotropic gel. The adjustment of the pH value of the water in the range from 2 to 4.7 before mixing in the gel former is important. Moreover, the use of boric acid is very favorable. One special advantage proposed is that the water be adjusted to a pH value from 4.1 to 4.7, which is a very advantageous pH value from the standpoint of preparing large quantities of the mixture. Before adding boric acid, sodium sulfate can be added to the water to support ion formation and to guarantee sufficient conductivity of the electrolytes at the beginning of the charging process.

The process described is also suitable for use in special storage battery housings, in which the positive and negative plates do not stand directly on the cell base, but a so-called sludge space is formed under them, since by setting the acid density before discharging, the remaining acid density can and must be considered after the formation of lead sulfate by discharge into the sludge space for the operating acid density.

For example, a manufacturing sequence can look so that after the storage battery cells are mounted, that is, after the end of the mechanical production of the storage battery, the battery is prepared first. For this purpose, it is preferably filled with sulfuric acid in a vacuum fill process, and the positive and negative plates are formed, that is, charged. This process lasts approximately 72 hours. Then, it is filled with a corresponding highly concentrated sulfuric acid by acid exchange, and by discharging roughly 35 hours, the desired sulfate ($PbSO_4$) is formed in the plates, where it is dimensioned so that the sulfate formed corresponds to the quantity necessary to adjust the desired final acid density of the industrial electrolyte.

The storage battery is thus prepared after being emptied.

Along with this, the dispersion is mixed in, which takes roughly one liter per 100 Ah nominal capacity. If the dispersion is now mixed, then the necessary amount of sodium sulfate ($Na_2SO_4$ can be added to the water. After it is dissolved, boric acid ($H_3BO_3$) is added to the water to set the pH value. The desired value of the pH should be between 2 and 4.7, preferably between 4.1 and 4.7.

Next, the thixotropic silicic acid $SiO_2$) is added to the water, a variation of embodiment of a gel former.

After the final mixing, the effectiveness of the dispersion can be tested by measuring the temperature. The temperature should have risen by roughly 5° C.

The storage battery can be filled with the finished dispersion, for example, with phosphoric acid ($H_3PO_4$) added in parallel, and circulation is maintained by blowing in compressed air. Circulation continues until the gelling process is used.

The storage battery is charged after filling and during the circulation, which is maintained, and is then ready for use.

What is claimed is:

1. A process for producing a thixotropic gel electrolyte for a lead storage battery cell having positive and negative plates, comprising:

storing art amount of sulfuric acid in the form of lead sulfate in active masses of the positive and negative plates in the storage battery cell, the amount of sulfuric acid being chosen as to adjust a desired final acid density in the lead storage battery cell;

adding an acid to a water to adjust the pH value of the water from 4.1 to about 4.7; thereafter mixing a gel former with the water to produce a water-gel former mixture; and filling the cell with the water-gel former mixture.

2. The process as set forth in claim 1, wherein the acid mixed with the water comprises boric acid.

3. The process as set forth in claim 2, further comprising:

adding sodium sulfate to the water before the addition of the boric acid.

4. The process as set forth in claim 1, wherein the sulfuric acid is circulated in the positive and negative plates during the storage of the sulfuric acid.

5. The process as set forth in claim 4, wherein the circulation is provided by blowing in air.

6. The process as set forth in claim 1, wherein the water-gel former mixture is circulated in the storage battery cells during the filling of the water-gel former mixture.

7. The process as set forth in claim 6, wherein the circulation is provided by blowing in air.

8. The process as set forth in claim 1, wherein after the storage battery cells are filled, the water-gel former mixture is circulated during a charging process until the use of a gelling process.

9. The process as set forth in claim 8, wherein the circulation is provided by blowing in air.

10. The process as set forth in claim 1, further comprising:

adding phosphoric acid as the lead storage battery is filled with the water-gel former mixture.

* * * * *